US008579711B2

(12) United States Patent
Nguyen et al.

(10) Patent No.: US 8,579,711 B2
(45) Date of Patent: Nov. 12, 2013

(54) MODULE FOR PROVIDING ADDITIONAL CAPABILITIES TO A GAMING MACHINE

(75) Inventors: Binh Nguyen, Reno, NV (US); Craig Paulsen, Reno, NV (US); Mike Kinsley, Reno, NV (US); John Goodman, Reno, NV (US)

(73) Assignee: IGT, Reno, NV (US)

(*) Notice: Subject to any disclaimer, the term of this patent is extended or adjusted under 35 U.S.C. 154(b) by 1191 days.

(21) Appl. No.: 10/927,581

(22) Filed: Aug. 25, 2004

(65) Prior Publication Data

US 2006/0046855 A1 Mar. 2, 2006

(51) Int. Cl.
*A63F 13/00* (2006.01)

(52) U.S. Cl.
USPC .................. 463/43; 463/16; 463/21; 463/25; 463/29; 463/30; 463/42; 463/47

(58) Field of Classification Search
USPC ............................ 463/25, 29, 40, 42, 43, 47
See application file for complete search history.

(56) References Cited

U.S. PATENT DOCUMENTS 5,523,948 A * 6/1996 Adrain ............................ 701/99
5,697,482 A 12/1997 Orus et al.
5,960,190 A * 9/1999 MacKenna ...................... 703/28
6,379,246 B1 * 4/2002 Dabrowski ...................... 463/16
6,439,996 B2 8/2002 LeMay et al.
6,622,185 B1 * 9/2003 Johnson et al. ................. 710/48
6,672,963 B1 1/2004 Link
6,716,103 B1 * 4/2004 Eck et al. ........................ 463/45
6,852,031 B1 2/2005 Rowe
6,979,266 B2 12/2005 Lemay et al.
2002/0025850 A1 2/2002 Hafezi (Continued)

FOREIGN PATENT DOCUMENTS

AU 2005204245 1/2011
CN 101238494 8/2008

(Continued)

OTHER PUBLICATIONS

Harris, Craig. Hoyle Casino—Game Boy Color Review at IGN, Oct. 25, 2000, IGN. p. 1-3. http://gameboy.ign.com/articles/164/164559p1.html.*

(Continued)

*Primary Examiner* — Dmitry Suhol
*Assistant Examiner* — Andrew Kim
(74) *Attorney, Agent, or Firm* — Foley & Lardner LLP

(57) ABSTRACT

The present invention provides various modules for use with gaming machines. One such module is configured to receive data from a portable memory device and/or from a network device, e.g., from a game server. In some embodiments, the module includes, or is disposed within, a player tracking unit. Some embodiments of the module include a central processing unit ("CPU") and a memory device such as a dual-ported random access memory ("DPRAM"). Data, such as software or content, may be downloaded to the module's CPU and written to the module's memory. According to some embodiments, data are written to a DPRAM in the module and simultaneously written from the DPRAM to the gaming machine via a high-speed digital bus. In some implementations, a memory in the module is configured to emulate a memory of the gaming machine. This allows a CPU of the gaming machine to execute software stored in the memory in the module. In alternative implementations, a CPU in the module can execute software stored in the memory in the module.

20 Claims, 10 Drawing Sheets

(56) References Cited

U.S. PATENT DOCUMENTS

| | | | | |
|---|---|---|---|---|
| 2002/0045484 | A1* | 4/2002 | Eck et al. | 463/42 |
| 2002/0138594 | A1 | 9/2002 | Rowe | |
| 2002/0144115 | A1 | 10/2002 | Lemay et al. | |
| 2003/0037030 | A1 | 2/2003 | Dutta et al. | |
| 2003/0188306 | A1 | 10/2003 | Harris et al. | |
| 2003/0200290 | A1 | 10/2003 | Zimmerman et al. | |
| 2003/0212859 | A1* | 11/2003 | Ellis et al. | 711/114 |
| 2004/0043814 | A1 | 3/2004 | Angell et al. | |
| 2004/0147314 | A1 | 7/2004 | LeMay et al. | |
| 2004/0214628 | A1 | 10/2004 | Boyd et al. | |
| 2005/0223219 | A1 | 10/2005 | Gatto et al. | |
| 2005/0235117 | A1* | 10/2005 | Floman et al. | 711/149 |
| 2005/0239538 | A1 | 10/2005 | Dixon | |
| 2005/0261062 | A1 | 11/2005 | Lewin et al. | |
| 2006/0046819 | A1 | 3/2006 | Nguyen et al. | |
| 2006/0046824 | A1 | 3/2006 | Silva et al. | |
| 2006/0046855 | A1 | 3/2006 | Nguyen et al. | |

FOREIGN PATENT DOCUMENTS

| | | |
|---|---|---|
| EP | 1934959 | 6/2008 |
| WO | 99/60498 | 11/1999 |
| WO | WO 2007/021506 A1 | 2/2007 |

OTHER PUBLICATIONS

International Search Report, mailed Nov. 24, 2006 from related International Application No. PCT/US2006/029549, 6 pp. including Notification of Transmittal.

Written Opinion of the International Searching Authority, mailed Nov. 24, 2006 from related International Application No. PCT/US2006/029549, 5 pp.

US Office Action dated Sep. 21, 2009 issued in U.S. Appl. No. 11/205,619.

US Office Action dated Sep. 21, 2009 issued in U.S. Appl. No. 11/225,406.

Chinese Office Action dated Aug. 21, 2009 issued in 200680028848.9.

US Interview Summary dated Jan. 25, 2010 issued in U.S. Appl. No. 11/205,619.

US Office Action dated Mar. 26, 2010 issued in U.S. Appl. No. 11/205,619.

US Interview Summary dated Jun. 30, 2010 issued in U.S. Appl. No. 11/205,619.

US Final Office Action dated Apr. 7, 2010 issued in U.S. Appl. No. 11/225,406.

Chinese Office Action dated May 17, 2010 issued in 200680028848.9.

Australian Office Action dated Apr. 1, 2010 issued in 2005204245.

U.S. Final Office Action dated Dec. 9, 2010, from U.S. Appl. No. 11/205,619.

U.S. Notice of Panel Decision from Pre-Appeal Brief Review dated May 9, 2011, from U.S. Appl. No. 11/205,619.

Australian Examination Report dated Nov. 17, 2010, from Application No. 2006280249.

Chinese Office Action dated Apr. 6, 2011, from Application No. 200680028848.9.

International Preliminary Report on Patentability dated Feb. 20, 2008, from Application No. PCT/US2006/029549.

Australian Examination Report dated Nov. 9, 2011, from Application No. 2006280249.

Australian Third Examination Report dated Dec. 14, 2011 issued in AU2006280249.

Chinese Office Action dated Jun. 23, 2011, from Application No. 200680028848.9.

US Office Action dated Mar. 15, 2013 issued in U.S. Appl. No. 11/225,406.

* cited by examiner

SOFTWARE DOWNLOAD CARD

MODULE FOR PROVIDING ADDITIONAL CAPABILITIES TO A GAMING MACHINE

BACKGROUND OF THE INVENTION

This invention relates to game playing methods for gaming machines such as video slot machines, video poker machines, bingo machines, etc. More particularly, the present invention relates to methods and apparatus for providing additional capabilities, e.g., downloading and gaming capabilities, to a gaming machine.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine, such as a top box that usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One method of maintaining a player's interest in game play is to provide new data, such as new or updated games, new content, etc., for gaming machines. As used herein, the term "data" will encompass software and content. In addition, it may be desirable to download data (e.g., new or updated software) for an associated device, such as a player tracking system and/or for a peripheral device. However, many installed gaming machines are not configured for downloading data from a network. In some instances, the gaming machine itself may not be configured for networking with a game server. In other instances, a gaming establishment may choose not to configure its gaming machines for communication with such network devices, e.g., because the gaming establishment does not have enough gaming machines to justify the cost of such a network. It would be desirable to provide devices and methods for overcoming at least some of the foregoing drawbacks.

SUMMARY OF THE INVENTION

The present invention provides various modules for use with gaming machines. The gaming machine may be, for example, a class 2 or a class 3 gaming machine. One such module is configured to receive data from a portable memory device and/or from a network device, e.g., from a game server. In some embodiments, the module includes, or is disposed within, a player tracking unit. Some embodiments of the module include a central processing unit ("CPU") and a memory device such as a dual-ported random access memory ("DPRAM"). Data, such as software or content, may be downloaded to the module's CPU and written to the module's memory. According to some embodiments, data are written to a DPRAM in the module and simultaneously written from the DPRAM to the gaming machine via a high-speed digital bus. In some implementations, a memory in the module is configured to emulate a memory of the gaming machine. This allows a CPU of the gaming machine to execute software stored in the memory in the module. In alternative implementations, a CPU in the module can execute software stored in the memory in the module.

Some embodiments of the invention provide a module for a gaming machine, including: a first module port configured for downloading first data from a server; a first random access memory ("RAM") having a first port and a second port. The second port is configured for communication with a digital communication bus. The module also includes a first processor configured to read downloaded data and write the downloaded data to the first RAM via the first port. The module is configured to emulate a second RAM of a gaming machine, the second RAM being configured for storing software for games of chance for execution on a second CPU of the gaming machine. The software for the games of chance is designed to control an input of cash or indicia of credit for wagers on the games of chance and to control an output of cash or indicia of credit from the gaming machine. Some such embodiments of the invention provide a player tracking unit that includes the module.

As used herein, the term "RAM" includes both read-only memory and read/write memory. Accordingly, the second RAM may include at least one electrically programmable read-only memory ("EPROM"). The module may have an in-circuit EPROM emulator for connecting the module and the EPROM. The module may include a second module port configured for downloading second data from a portable memory device.

Some modules of the present invention include the following elements: a first module port configured for downloading first data from a portable memory device; a DPRAM having a first port and a second port. The second port is configured for communication with a digital communication bus and the DPRAM is configured to be simultaneously accessible by both the module's CPU and the game machine's CPU. The module also includes a central processor configured to read downloaded data and write the downloaded data to the DPRAM via the first port. The DPRAM is further configured to transfer the downloaded data to a gaming machine via a digital bus connection. The gaming machine is operable to receive an input of cash or indicia of credit for wagers on games of chance and to control an output of cash or indicia of credit from the gaming machine.

The module may include a second module port configured for downloading second data from a server. Some such modules include a digital communication bus configured for communication between the second port and the digital bus connection. Moreover, some such modules are part of a player tracking unit.

Alternative gaming machine modules according to the invention include the following: a first module port configured for downloading first data from a server; a DPRAM having a first port and a second port, the second port configured for communication with a digital communication bus. The DPRAM is configured to be simultaneously accessible by both the module's CPU and the game machine's CPU to read and write from the first port and the second port. The module includes a first central processor configured to read downloaded data and write the downloaded data to the DPRAM via the first port. The module is further configured to emulate a gaming machine memory configured for storing software for games of chance. The software is designed to control an input of cash or indicia of credit for wagers on the games of chance and to control an output of cash or indicia of credit from the gaming machine.

The module may include a second module port configured for downloading second data from a portable memory device and/or an in-circuit memory emulator for connecting the module and the gaming machine memory.

Some embodiments of the invention provide a player tracking unit that includes the following elements: a first port; a first CPU configured for enabling player tracking functionality and for communication with a game server via the first port; a first RAM configured for communication with the first CPU and for communication with a second CPU of a gaming machine. The first RAM is configured to receive downloaded games of chance from the first CPU and to emulate a second RAM of the gaming machine. The second RAM is configured for storing software for games of chance for execution on a second CPU of the gaming machine. The software is designed to control an input of cash or indicia of credit for wagers on the games of chance and to control an output of cash or indicia of credit from the gaming machine. The second RAM may include an EPROM.

The player tracking unit may include a second port configured for communication with a portable memory device. A gaming machine may include the player tracking unit.

Alternative player tracking units of the invention include: a first port; a first CPU configured for enabling player tracking functionality and for downloading games of chance from a game server via the first port; and a first RAM configured for communication with the first CPU. The first RAM is also configured to store downloaded games of chance from the first CPU. The first CPU is further configured for executing the downloaded games of chance, thereby bypassing a second CPU of a gaming machine. The gaming machine is configured to control an input of cash or indicia of credit for wagers on the games of chance and to control an output of cash or indicia of credit.

Some implementations of the invention provide a gaming method including the following steps: writing data from a portable memory device to a first CPU of a player tracking device; writing the data from the first central processing unit to a first memory of the player tracking device while simultaneously reading the data by a second CPU of a gaming machine; and writing the data from the second CPU of the gaming machine to a second memory of the gaming machine, wherein the gaming machine is operable to receive an input of cash or indicia of credit for wagers on games of chance and to control an output of cash or indicia of credit from the gaming machine. The step of writing the data to the first CPU may involve writing data from a portable memory device.

Some implementations of the invention provide a gaming system including a module, a gaming machine and a digital communication bus. The module includes a first module port configured for downloading first data from a server and a DPRAM having a first port and a second port, the second port configured for communication with a digital communication bus. The DPRAM is configured to be simultaneously read/write accessible from the first port and from the second port. The module also includes a central processor configured to read downloaded data and write the downloaded data to the DPRAM via the first port. The gaming machine includes apparatus for receiving an input of cash or indicia of credit for wagers on games of chance; devices for playing the games of chance; and a logic device for controlling an output of cash or indicia of credit from the gaming machine according to outcomes of the games of chance. The digital communication bus connects the second port with the gaming machine. The gaming machine is further configured to read the downloaded data via second port and the digital communication bus.

In some such gaming systems, the module is further configured to provide the functionality of a player tracking unit. The gaming system may include a second module port configured for downloading second data from a portable memory device. The second module port may be a USB port.

These and other features and advantages of the invention will be described in more detail below with reference to the associated drawings.

DESCRIPTION OF THE PREFERRED EMBODIMENTS

Although the present invention may be manifested in a variety of ways, some implementations of the present invention provide a module for providing enhanced functionality for existing gaming machines. Preferably, few (or no) modifications are made to the main gaming machine itself, so that the module may simply be added to an existing gaming machine. The module may be configured to receive data from a portable memory device and/or from a network device, e.g., from a game server, a content server, etc.

In some embodiments, the module includes, or is disposed within, a player tracking unit. U.S. patent application Ser. Nos. 10/246,373 and 10/241,398, respectively entitled "Player Tracking Communication Mechanisms In A Gaming Machine" and "Method and Apparatus for Managing Gaming Machine Code Downloads," are hereby incorporated by reference. Application Ser. Nos. 10/246,373 and 10/241,398 describe, inter alia, some player tracking units that may be modified to perform some of the method of the present invention.

Figure 1:
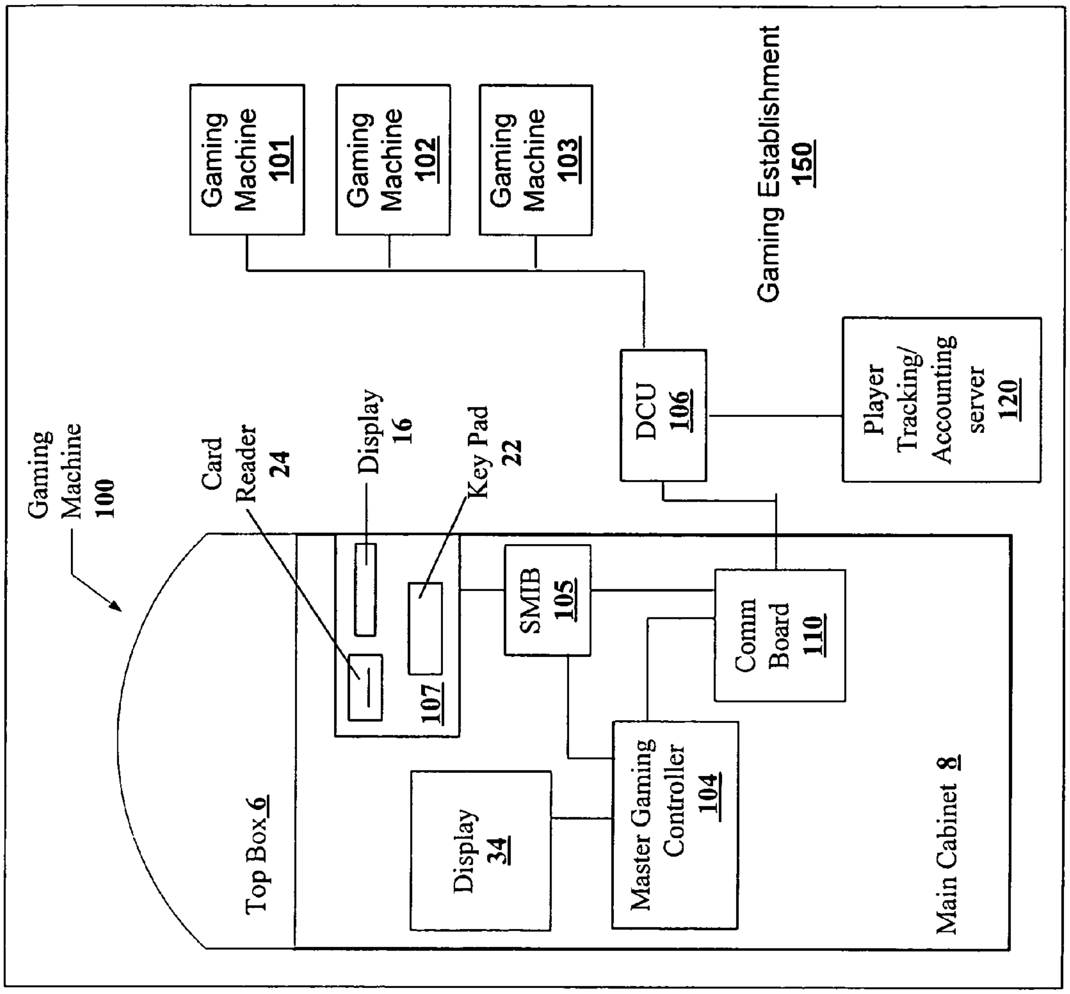
FIG. 1 is a block diagram of a number of gaming machines with player tracking units connected to servers providing player tracking services.

FIG. 1 is a block diagram of an illustrative conventional player tracking system. Although the player tracking system shown in FIG. 1 is described as "conventional" herein, it may be the basis for novel player tracking systems, including those provided by the present invention. FIG. 1 illustrates a number of gaming machines with player tracking units connected to servers providing player tracking services. In gaming establishment 150, gaming machines 100, 101, 102 and 103 are connected, via the data collection unit (DCU) 106 to the player tracking/accounting server 120. The DCU 106, which may be connected to up to 32 player tracking units as part of a local network in a particular example, consolidates the information gathered from player tracking units in gaming machines 100, 101, 102 and 103 and forwards the information to the player tracking account server 120. The player tracking account server is designed 1) to store player tracking account information, such as information regarding a player's previous game play, and 2) to calculate player tracking points based on a player's game play that may be used as basis for providing rewards to the player.

In gaming machine 100 of gaming establishment 150, a player tracking unit 107 and slot machine interface board (SMIB) 105 are mounted within a main cabinet 8 of the gaming machine. A top box 6 is mounted on top of the main cabinet 8 of the gaming machine. In many types of gaming machines, the player tracking unit is mounted within the top box 6. Usually, player tracking units, such as 107, and SMIBs, such as 105, are manufactured as separate modules before installation into a gaming machine, such as 100. Accordingly, some embodiments of the present invention are combined with a preexisting module, such as a player tracking unit, for easy integration with existing gaming machines. Such embodiments include specialized features for performing the types of enhancements that they provide to the gaming machine. These features will be described in detail below.

The player tracking unit 107 includes three player tracking devices, a card reader 24, a key pad 22, and a display 16, all mounted within the unit. The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush or at a slight angle upward with a horizontal in a flat top gaming machine.

The player tracking unit 107 communicates with the player tracking server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking server 120 to calculate player tracking points for the player. In the example shown in FIG. 1, the player tracking unit 107 is connected to the master gaming controller 104 via a serial connection using a wire serial connector and communicates with the master gaming controller 104 using a serial communication protocol. However, as described below (e.g., with reference to FIG. 3A), some preferred implementations of the invention communicate with the gaming machine across a digital bus. Some implementations include both a serial bus and a digital bus.

The serial connection between the SMIB 105 and the master gaming controller 104 may be through the main communication board 110, through another intermediate device or through a direct connection to the master gaming controller 104. In general, communication between the various gaming devices is provided using wire connectors with proprietary communication protocols. As an example of a proprietary serial communication protocol, the master gaming controller 104 may employ a subset of the Slot Accounting System (SAS protocol) developed by International Game Technology of Reno, Nev. to communicate with the player tracking unit 107.

In this example, when a game player wants to play a game on a gaming machine and utilize the player tracking services available through the player tracking unit, a game player inserts a player tracking card, such as a magnetic striped card, into the card reader 24. Co-pending U.S. patent application Ser. No. 10/214,936, filed Aug. 6, 2002 and entitled "Flexible Loyalty Points Programs," is hereby incorporated by reference for all purposes. As described in application Ser. No. 10/214,936, various other types of player tracking cards, devices and readers may be used. Here, after the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 107 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

Some embodiments of the invention allow data to be downloaded from a portable memory device to a module such as a player tracking device. The data may include software or content, such as advertisements, video clips, etc. In some such embodiments, the data are downloaded from a "smart card" or similar card, using a card reader of a player tracking unit. U.S. patent application Ser. No. 09/718,974, entitled "EZ Pay Smart Card and Ticket System," which describes relevant methods and devices for downloading software from smart cards, is hereby incorporated by reference.

In other embodiments, the data are downloaded from a memory stick into a port of the module, such as a USB port. U.S. Pat. No. 6,439,996, entitled "Key for a Gaming Machine and Method of Use Thereof," which describes relevant methods and devices for downloading information from a portable memory device to a communication port of a gaming machine, is hereby incorporated by reference. Modules suitable for downloading will be described below with reference to FIGS. 2A and 2B.

Figure 2A:
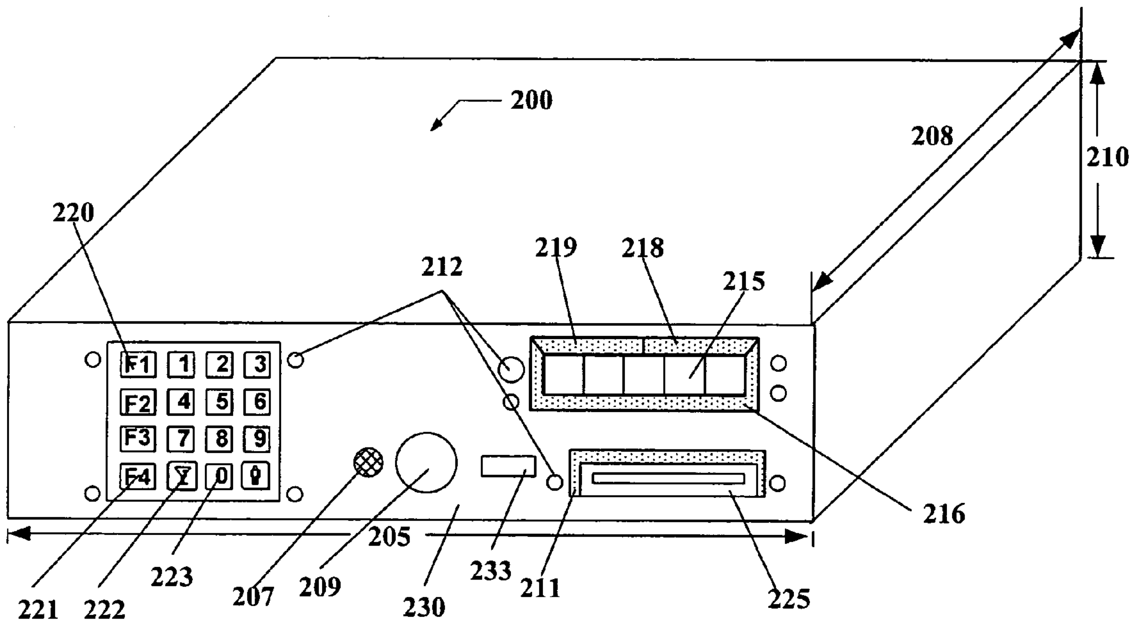
FIGS. 2A and 2B are perspective diagrams of two embodiments of modules according to the present invention.
Figure 2B:
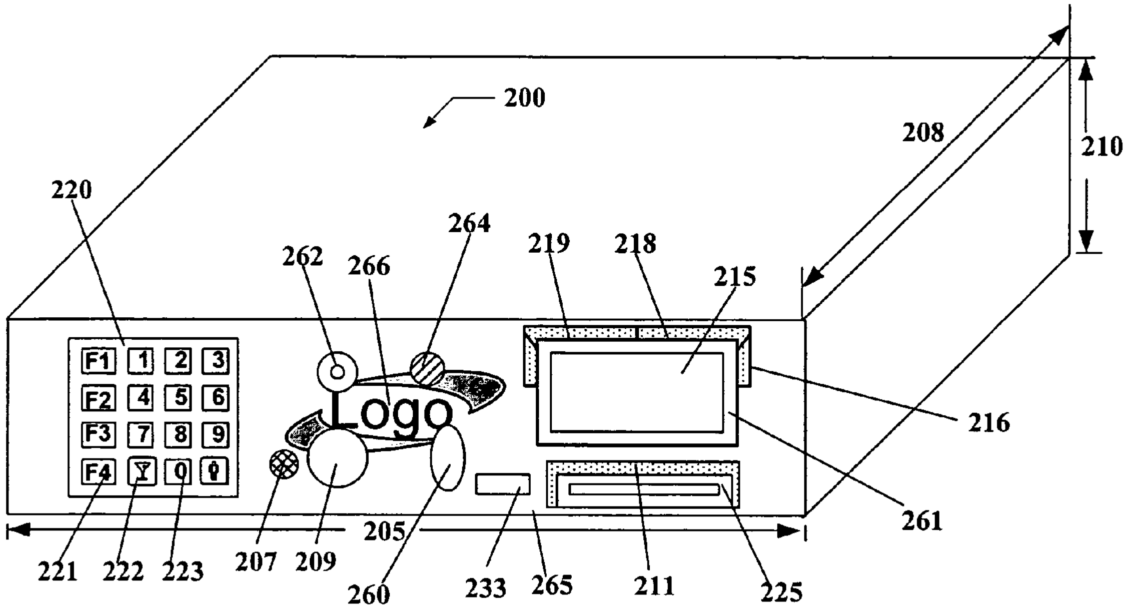

FIGS. 2A and 2B are perspective diagrams of different embodiments of modules of the present invention. In these examples, the modules also provide the functionality of player tracking units. Details of FIGS. 2A 2B not described herein are set forth with reference to FIGS. 2A and 2C of U.S. patent application Ser. No. 10/246,373, entitled "Player Tracking Communication Mechanisms In A Gaming Machine," which has been incorporated herein by reference for all purposes.

FIG. 2A is a front diagram for a housing or chassis 200 enclosing a number of interface peripherals. The interface peripherals may be used to provide input and output (I/O) to one or more network devices, to various types of portable storage devices, or to other gaming systems such as a gaming machine. The device housing 200 may enclose a logic device (not shown) and other electronics configured to execute the methods of the present invention or the logic device may be enclosed in a logic device housing separate from the device housing 200.

Using the interface devices enclosed in the housing 200, data may be downloaded and information, such as gaming and player tracking information, may be input to the module. Information may be visually and aurally communicated to various individuals that may use the module, such as game players, casino service representatives and maintenance technicians. Illumination devices, such as back lit key pad buttons (e.g. 221, 222 and 223), light 211 and light 216 and sound projection devices, such as speaker 209, can visually and/or aurally communicate game information, display content, etc. The function buttons, F1, F2, F3 and F4 (i.e. 221) may be used to provide various services through the module.

The device housing 200 encloses a display 215, a key pad 220, a microphone 207, a speaker 209, a card reader 225, a light 216 adjacent to the card reader 225 and a light 216 adjacent to the display 215. The modules shown in FIGS. 2A and 2B include card readers 225 that can read data from a portable storage device such as a "smart card." Moreover, the modules shown in FIGS. 2A and 2B include ports 233 for downloading data from other types of portable storage devices, such as memory sticks. These ports may be accessible, as shown, but are preferably located in a protected area, e.g., in a locked box.

The dimensions of the device housing 200, (e.g. 205, 208 and 210) are shown in FIGS. 2A and 2B. The device housing 200 is shown as a rectangular box for illustrative purposes only. A shape of the device housing 200 is variable and is not strictly limited to rectangular shapes. Further, dimensions of the cut-outs on the face plate 230 for the player tracking interface devices may vary depending the manufacturer of a particular interface peripheral device which may be used in a player tracking device.

FIG. 2B is a front diagram for a housing or chassis 200 enclosing a number of interface peripherals according to another embodiment of the present invention. The front plate 230 is covered with a decorative skin 265 with a silk-screen logo 266.

In addition to the player tracking interface devices described with respect to FIG. 2A, the player tracking housing 200 includes a wireless interface 264, a camera 262 and a finger-print reader with platen 260. A description of a finger print reader as an identification device is provided in co-pending U.S. patent application Ser. No. 09/172,787, filed Oct. 14, 1998, by Wells, et al., entitled "Gaming Device Identification method and Apparatus," which is incorporated herein in its entirety and for all purposes.

In this example, display 215 is a color LCD. Other display technologies (such as organic electro-luminescent devices) may be used with the display 215. Display 215 and speaker 209 may be used for any convenient purpose, e.g., to reproduce downloaded content such as video clips or advertisements, to communicate game information, to display information regarding the status of a data download, of software installation, etc. For instance, when a portable memory device such as a card has been inserted incorrectly in the card reader 225, a message (e.g., "card not inserted correctly") may be projected from the speaker. Many different types of information may be visually or aurally communicated using the present invention and such information is not limited to the examples provided above.

User preferences, such as the language preferred by the person using the machine may be stored on a portable memory device. According to some implementations, such information may be stored on a smart card, memory stick, player tracking card, etc. Alternatively, a user of the module may be able to specify a language using one of the input devices on the module. For example, such preferences may be based on a user profile previously established by the person using the module.

Figure 3A:
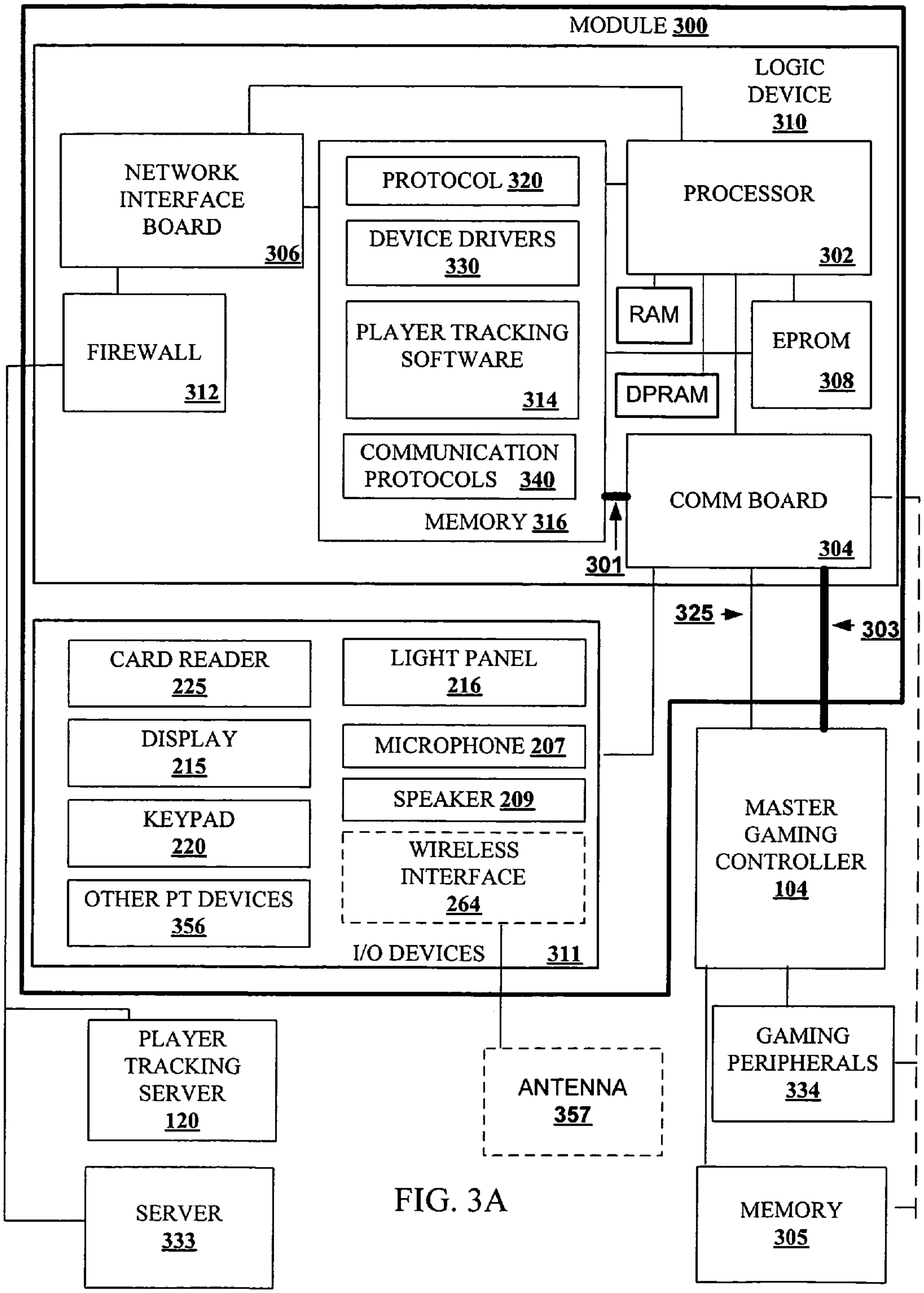
FIG. 3A is a block diagram of the components of a module according to some embodiments of the present invention.

FIG. 3A is a block diagram of an embodiment of a module 300 of the present invention connected to a gaming machine and two exemplary network devices. The module 300 includes a logic device 310 enclosed in a logic device housing and a number of interface devices including a card reader 225, a display 215, a key pad 220, a light panel 216, a microphone 207, a speaker 209, a wireless interface and other interface devices 356 enclosed in a device housing 311. The logic device 310 for the module and the interface devices may be enclosed in a single housing (see FIGS. 2A and 2B) or in separate housings.

The logic device 310 may include one or more processors for executing software allowing the module 300 to perform various functions such as communicating with servers 120 and 333 and one or more components of a gaming machine. In this example, module 300 is networked for communication with player tracking server 120 and game server 333. In other implementations, a module may be configured for communication with other network devices, such as servers for downloading content such as audio, video, advertisements, etc. Alternatively, a module could be configured for communication with a messaging server, a cashless system server, or other network devices. As noted above, it is desirable to provide a module that requires few or no modifications of the gaming machine.

Module 300 preferably performs data authentication and verification functions for downloaded data. In some embodiments, the verification may be performed by processor 302. Alternatively, the gaming machine (e.g., master gaming controller 104 could authenticate and verify downloaded data. The former option is preferable, so that the gaming machine does not need to be reconfigured for authentication and verification purposes.

In this example, logic device 310 allows module 300 to communicate with master gaming controller 104 and to operate various peripheral devices, such as card reader 225, display 215, key pad 220 and light panel 216. For instance, the logic device 310 may send messages containing player tracking information to the display 215. As another example, the logic device 310 may send commands to the light panel 216 to display a particular light pattern and to the speaker 209 to project a sound to visually and aurally convey game information. The logic device 310 may utilize a microprocessor and/or microcontrollers. For instance, the light panel 216 may include a microcontroller that converts signals from the processor 302 to voltage levels for one or more illumination devices. U.S. Pat. No. 6,368,216, entitled "Gaming Machine Having Secondary Display for Providing Video Content," is hereby incorporated by reference.

In one embodiment, application software for module 300 and configuration information for the player tracking unit may be stored in a memory device such as an EPROM 308, a non-volatile memory, hard drive or a flash memory. Here, module 300 also includes memory 316. In this example, memory 316 is configured to store: 1) player tracking software 314 such as data collection software, 2) communication protocols (e.g. 320) allowing module 300 to communicate with different types of network devices, 3) device drivers for many types of interface devices (e.g. 330), 4) voice recognition software for receiving voice commands from the microphone 207, 5) a secondary memory storage device such as a non-volatile memory device, configured to store gaming software related information (the gaming software related information and memory may be used in a game download process or other software download process), and 6) communication transport protocols [(e.g. 340) such as TCP/IP, USB, IEEE1394, Bluetooth, IEEE 802.11a, IEEE 802.11b, IEEE 802.11x (e.g. other IEEE 802.11 standards), hiperlan/2, and HomeRF allowing module 300 to communicate with devices using these protocols or communication protocols allowing the logic device to communicate with different types of master gaming controllers (e.g. master gaming controllers using different types of communication protocols), such as 104.

In the embodiment shown in FIG. 3A, module 300 communicates with the gaming machine using 2 different interfaces. Interface 325 is a relatively low speed serial bus that is suitable for, e.g., communicating player tracking information. Accordingly, the master gaming controller, such as 104, communicates over bus 325 using a serial communication protocol. A few examples of serial communication protocols that may be used to communicate with the master gaming controller include but are not limited to USB, RS-232 and Netplex (a proprietary protocol developed by IGT, Reno, Nev.). Interface 325 is primarily used to bridge to legacy machines.

Interface 303 is a high speed digital bus that is suitable for rapidly transferring data between module 300 and the gaming machine. The digital bus may be any convenient width, for example, a 32-bit width. In that case, there would be 32 digital I/O lines.

In the example shown, interface 301 is also a high-speed interface. This configuration allows data downloaded from a network device or a portable memory device to be stored in memory 316 temporarily, then downloaded to master gaming controller 104 via the dual ported random access memory ("DPRAM") interface either immediately, or at some later time. Data can be simultaneously read from and written to a DPRAM module. Therefore, in implementations that include a DPRAM module, e.g., in logic device 310 or on the Communication Board 304, downloaded data can be simultaneously written to the DPRAM module from a processor (e.g. processor 302 or a processor of network interface board 306) and written to the gaming machine (here, to master gaming controller 104). Master gaming controller 104 can store the data in a memory device of the gaming machine.

Depending on the embodiment of module 300, logic device 310 may enable module 300 to bypass master gaming controller 104 and communicate directly with other components of a gaming machine. These components may include memory 305 and/or gaming peripherals 334. For example, in some embodiments of the invention, this direct communication allows a memory of module 300 to emulate memory 305 of the gaming machine. Memory 305 may be, for example, a random access memory such as an EPROM that contains gaming software that is intended to be executed by master gaming controller 104. As used herein, a "random access memory" includes both read-only memory ("ROM") and read/write memory such as DRAM and SRAM. A connection such as a jumper (e.g., an EPROM emulator) could connect module 300 to memory 305, e.g., to an EPROM socket. Such a connection should be pin-to-pin compatible with memory 305. When the master gaming controller 104 seeks to execute a program stored in memory 305, the game codes are actually coming from module 300 (e.g., previous downloaded to the EPROM emulator from memory 316). This configuration allows master gaming controller 104 to execute software directly from module 300. Such a configuration is particularly advantageous because it eliminates the need for, e.g., replacing an EPROM of the gaming machine or reconfiguring a CPU of a legacy machine to process and store downloaded data.

In alternative embodiments of the invention, a processor of module 300 is configured to perform gaming machine functions. For example, processor 302 may execute gaming software that has been downloaded and stored in a memory of module 300 (e.g., in memory 316), thereby bypassing (at least in part) the functionality of master gaming controller 104. Alternatively, one or more processors are dedicated to gaming and one or more other processors perform the other functions of module 300 (e.g., player tracking functions). In implementations wherein module 300 is executing gaming software, module 300 preferably controls at least some of gaming peripherals 334 for implementation of a game (e.g., a game of chance).

Some preferred embodiments of module 300 (e.g., wherein one or more processors of module 300 are configured to perform gaming machine functions) are implemented with special features and/or additional circuitry that differentiates gaming machines of the present assignee from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset since the operating system is presumably crashed or other malfunctions occurred. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA 232 serial interfaces provided by general-purpose computers. These interfaces may include EIA 485, EIA 422, Fiber Optic Serial, Optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel. Interfaces to external devices are typically optically coupled (isolated) to prevent possible ESD damages to internal circuitry, or unexpected failure with $3^{rd}$-party peripherals. Optical isolation also provides added security against unauthorized data sniffing devices.

IGT Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

A plurality of device drivers may be stored in memory 316 for each type of player tracking device. For example, device drivers for five different types of card readers, six different types of displays, seven different types of portable memory modules and eight different types of key pads may be stored in the memory 316. When one type of a particular peripheral device is exchanged for another type of the particular device, a new device driver may be loaded from the memory 316 by the processor 302 to allow communication with the device. For instance, one type of card reader in module 300 may be replaced with a second type of card reader where device drivers for both card readers are stored in the memory 316.

In some embodiments, the software units stored in the memory 316 may be upgraded as needed. For instance, new device drivers or new communication protocols may be downloaded to memory 316 from a network device, a portable memory device such as a smart card or a memory stick, or from some other external device. As another example, when the memory 316 is a CD/DVD drive containing a CD/DVD designed or configured to store the player tracking software 314, the device drivers and other communication protocols, the software stored in the memory may be upgraded by replacing a first CD/DVD with a second CD/DVD. In yet another example, when the memory 316 uses one or more flash memory units designed or configured to store the player tracking software 314, the device drivers and other communication protocols, the software stored in the flash memory units may be upgraded by replacing one or more flash memory units with new flash memory units storing the upgraded software.

In one embodiment of the present invention, a minimal set of player tracking software applications 314, communication protocols 340, communication protocols and device drivers may be stored on in the memory 316. For instance, an operating system, a communication protocol allowing module 300 to communicate with a remote server such as the player tracking server 120 and one or more common player tracking applications may be stored in memory 316. When the player tracking unit is powered-up, module 300 may contact a remote server 120 and download specific player tracking software from the remote software. The downloaded software may include, but is not limited to one or more particular applications that are supported by the remote server, particular device drivers, software upgrades and particular communication protocols supported by the remote servers. Details of methods for downloading player tracking software are described in co-pending U.S. patent application Ser. No. 09/838,033, filed on Mar. 19, 2001, by Criss-Puskiewicz, et al., entitled, "UNIVERSAL PLAYER TRACKING SYSTEM," which application is incorporated herein in its entirety and all for purposes.

The logic device 310 includes a network interface board 306 configured or designed to allow communication between module 300 and other remote devices such as server 120, 333, etc. These servers may reside on local area networks, such as a casino area network, a personal area network such as a piconet (e.g. using Bluetooth), or a wide area network such as the Internet. The network interface board 306 may allow wireless or wired communication with the remote devices.

The network interface board may be connected to a firewall 312. The firewall may be hardware, software or combinations of both that prevent illegal access of the gaming machine by an outside entity connected to the gaming machine. The internal firewall is designed to prevent someone such as a hacker from gaining illegal access to a module 300 or a gaming machine and tampering with it in some manner. For instance, an illegal access may be an attempt to plant a program in module 300 that alters the operation of the gaming machine allowing it to perform an unintended function.

The communication board 304 may be configured to allow communication between the logic device 310 and interface devices including 225, 215, 220, 216, 207, 209 and 356 and to allow communication between the logic device 310 and the gaming machine (e.g., with master gaming controller 104, memory 305 and/or gaming peripherals 334.

Optional wireless interface 264 may be used to allow module 300 and possibly the gaming machine to communicate with portable wireless devices or stationary devices using a wireless communication standard. The wireless interface 264 may be connected to an antenna 357. In some embodiments, the wireless interface 264 may be incorporated into the communication board 304. In addition, in some embodiments, the logic device 310 and the master gaming controller 104 may communicate using a non-proprietary standard wireless communication protocol such as Bluetooth, IEEE 802.11a, IEE802.11b, IEEE802.11x (e.g. other IEEE802.11 standards), hiperlan/2, and HomeRF or using a non-proprietary standard wired communication protocol such as USB, Firewire, IEEE 1394 and the like. In the past, gaming machine have primarily used proprietary standards for communications between gaming devices. In other embodiments, the logic device 310 and the gaming machine may communicate using a proprietary communication protocol used by the manufacturer of the gaming machine. The communication between module 300 and any other external or internal devices may be encrypted.

In one embodiment, the logic device 310 may poll interface devices for information. For instance, the logic device 310 may poll the card reader 225 to determine when a card has been inserted into the card reader or may poll the key pad 220 to determine when a button key has been depressed. In some embodiments, the interface devices may contact the logic device 310 when an event has occurred, such as a card being inserted into the card reader.

The logic device 310 may poll one or more processors that control gaming (e.g., master gaming controller 104) for game usage information. For instance, the logic device 310 may send a message to the master gaming controller 104 such as "coin in." The master gaming controller may respond to the "coin in" message with an amount when credits are registered on the gaming machine.

The logic device 310, using an appropriate device driver, may send instructions to the various interface devices to perform specific operations. For instance, after a card has been inserted into the card reader 225, the processor logic device may send a "read card" instruction to the card reader and a "display message A" instruction to the display 215. In addition, the logic device 310 may be configured to send instructions, or to allow the master gaming controller 104 to send instructions, to the interface devices via the logic device 310. As an example, after a card has been inserted into the card reader 225, the processor logic 310 may determine that the card is for a gaming application controlled by the master gaming controller 204 and send a message to the master gaming controller 104 indicating a card has been inserted into the card reader. In response, to the message from the logic device, the master gaming controller 104 may send a series of commands to the player tracking interface devices such as a "read card" instruction to the card reader 225, a flash light pattern "A" command to the light panel 216, and a "display message" instruction to the display 215 via the logic device 310. The instructions from the master gaming controller 104 to the player tracking interface devices may be obtained from gaming application software executed by the master gaming controller 104. The gaming application software may or may not be related to player tracking services.

Module 300 may include one or more standard peripheral communication connections (not shown). The logic device 310 may be designed or configured to communicate with interface devices using a standard peripheral connection, such as an USB connector, and using a standard communication protocol, such as USB. The USB standard allows for a number of standard USB connectors that may be used with the present invention. Module 300 may contain a hub connected to the peripheral communication connection and containing a plurality of peripheral communication connections. Details of using a standard peripheral communication connection are described in U.S. Pat. No. 6,251,014, issued Jun. 26, 2001, by Stockdale, et al., entitled, "STANDARD PERIPHERAL COMMUNICATION," which is incorporated herein in its entirety and for all purposes.

Figure 3B:
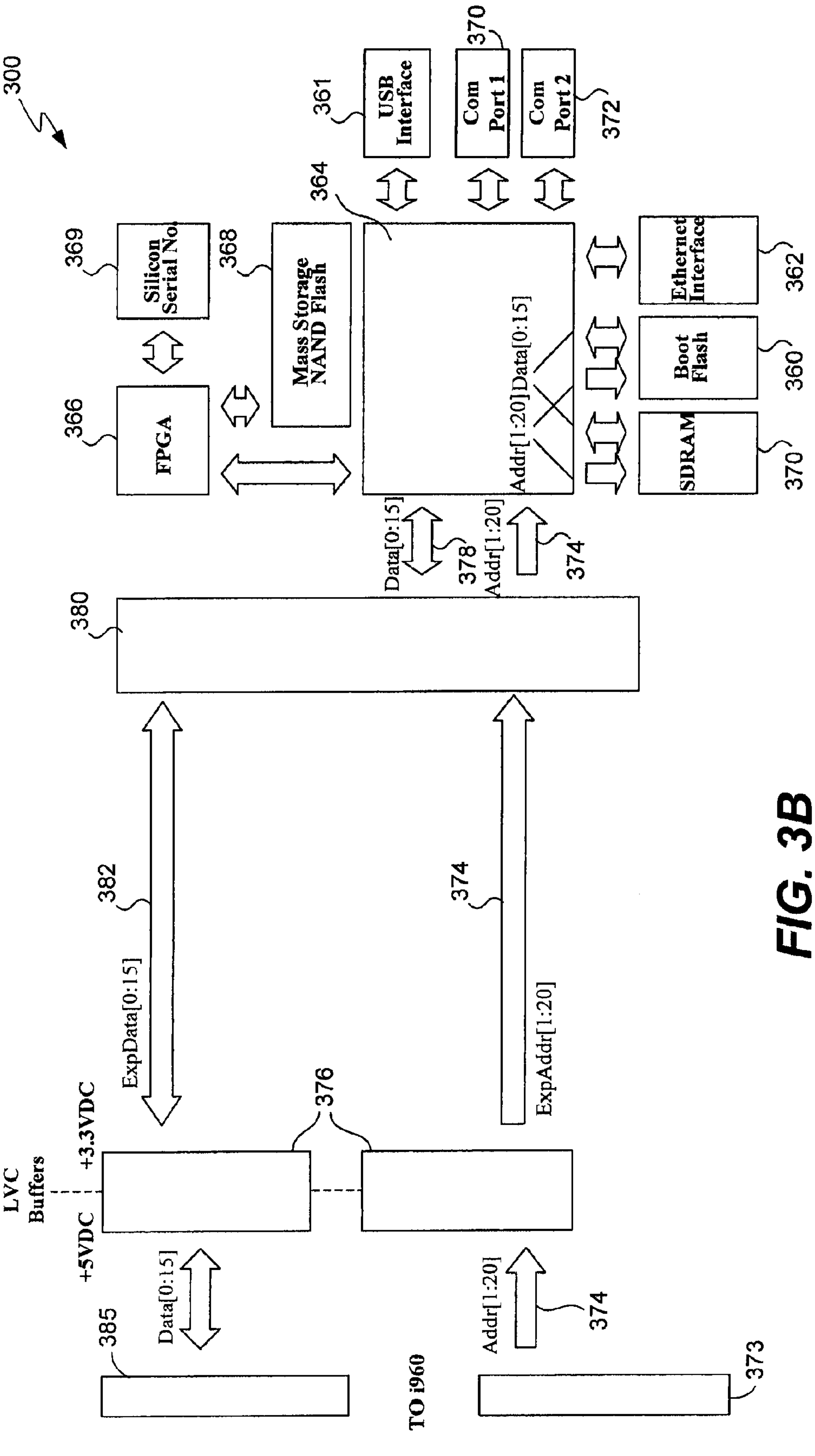
FIG. 3B is a block diagram of the components of a module according to alternative embodiments of the present invention.

FIG. 3B illustrates an alternative embodiment of a module 300 according to the present invention. In this example, flash memory 360 stores software for initializing and configuring module 300.

Data may be downloaded into module 300 via interfaces 361 and 362. Interface 361 is configured for communication with a portable memory device, such as a memory stick or a memory card. Here, interface 361 is a USB interface, but interface 361 could be any convenient interface configured for receiving data from a portable memory device. Interface 362 is configured for receiving data from a network, e.g., from a game server. Although interface 362 is an Ethernet interface in this example, interface 362 could be any convenient interface suitable for communication with a network. Downloaded data are received by CPU 364 from interface 361 and/or interface 362.

Here, processor 366 is configured to apply security policies to data received by CPU 364. For example, processor 366 may authenticate received data, apply decryption algorithms, decompression algorithms, etc. Conversely, processor 366 may add authentication information and apply encryption algorithms, compression algorithms, etc., to transmitted data. In this example, processor 366 is also responsible for monitoring security-related events such as changes to memory, opening the module, etc. Processor 366 could be any type of processor, but is a field programmable gate array in this embodiment. In this example, memory 369 is a non-volatile memory that contains an unique identification code for module 300. This code is preferably included as authentication information in transmissions from module 300, e.g., in requests for gaming software from a game server.

After downloaded data have been authenticated, decrypted, etc., they are stored in memory 368. Here, memory 368 is a NAND flash memory, but memory could be any reliable memory suitable for storing relatively large amounts of data, e.g. a hard drive. Memory 370 is used for storing programs and memory that is quickly accessible by CPU 364, such as software that CPU is currently running. Ports 371 and 372, which are serial communication ports in this example, are configured for communication with other devices, such as a display, another computer, etc.

Connections 373 and 385 are configured for communication with a gaming machine. Preferably, connections 373 and 385 are high-speed parallel connections, so that data can be transferred between module 300 and the gaming machine at high speed. In this example, connector 385 is connected to one of buffers 376 via a 16 bit wide ribbon cable. Similarly, connector 373 is connected to another of buffers 376 via a 20 bit wide ribbon cable.

When a gaming machine is ready to receive data from module 300, the gaming machine sends request 374 to module 300. Preferably, request 374 indicates a specific memory location of the gaming machine to which the data will be written. Buffers 376 perform signal conversion, if necessary, between the type of signal used by the gaming machine and the type of signal used by module 300. In this example, the gaming machine uses 5V signals and the module 300 uses 3.3V signals, so request 374 is converted from 5V to 3.3V.

Request 374 is received at DPRAM 380 and read by CPU 364, which then retrieves requested data from memory 368. The data are transmitted to DPRAM 380. Then the data are read by gaming machine via connection 385. Data can be written to DPRAM 380 by CPU 364 and simultaneously read by the gaming machine.

At some times, the gaming machine will be unable to accept downloaded data, e.g., when a game is being played on the gaming machine. In such circumstances, DPRAM 380 can retain data received from CPU 364 until the gaming machine is ready to accept the downloaded data. Meanwhile, CPU 364 will stop loading the DPRAM until the previously written data buffer has been read by the game machine.

Figure 4:
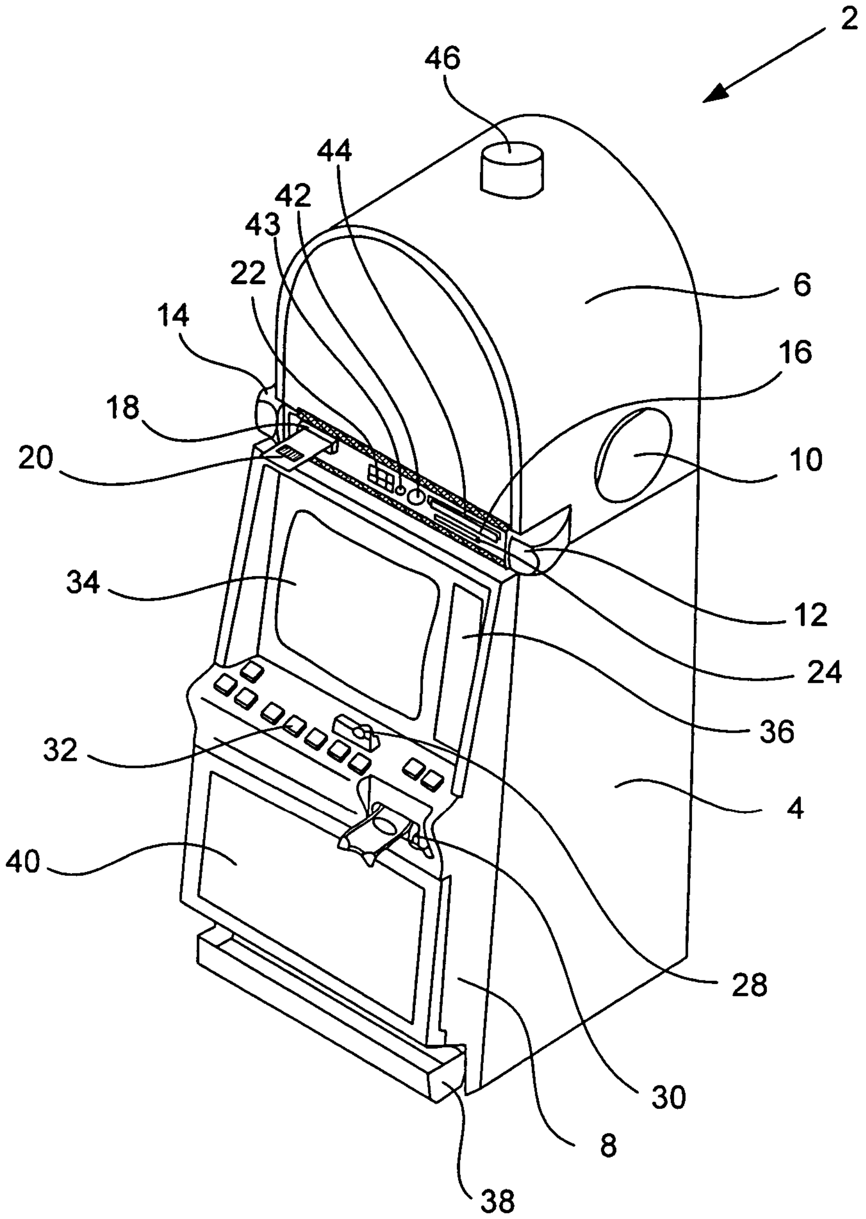
FIG. 4 is a perspective drawing of a video gaming machine of the present invention.

In FIG. 4, a video gaming machine 100 of the present invention is shown. Machine 100 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 100. The devices are controlled by circuitry housed inside the main cabinet 4 of the machine 100. Many possible games, including traditional slot games, video slot games, video poker, video black jack, video keno, video pachinko, lottery games and other games of chance as well as bonus games may be provided with gaming machines of this invention.

The gaming machine 100 includes a top box 6, which sits on top of the main cabinet 4. The top box 6 houses a number of devices, which may be used to add features to a game being played on the gaming machine 100, including speakers 10, 12, 14, a ticket printer 18 which may print bar-coded tickets 20 used as cashless instruments. Here, a module mounted within the top box 6 includes player tracking capabilities and enhanced data downloading capabilities, as described above. A key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. A player playing a game on the gaming machine 100 or a person near the gaming machine may view the light patterns from the light panel 216. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 100 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may or may not include such features as bill validators, coin acceptors and coin trays. Instead, they may have only ticket readers, card readers and ticket dispensers. Those of skill in the art will understand that the present invention, as described below, can be deployed on most gaming machines now available or hereafter developed.

Returning to the example of FIG. 4, when a user wishes to play the gaming machine 100, he or she inserts cash through the coin acceptor 28 or bill validator 30. In addition, the player may use a cashless instrument of some type to register credits on the gaming machine 100. For example, the bill validator 30 may accept a printed ticket voucher, including 20, as an indicium of credit. As another example, the card reader 24 may accept a debit card or a smart card containing cash or credit information that may be used to register credits on the gaming machine.

Prior to beginning a game play session on the gaming machine 100, a player may insert a player tracking card into the card reader 24 to initiate a player tracking session. In some embodiments, after inserting the card, the player may be visually prompted on the display screen 16 or aurally prompted using the speaker to enter identification information such as a PIN code using the key pad 22. Typically, the player tracking card may remain in the card reader 24 during the game play session. As described in co-pending U.S. patent application Ser. No. 10/214,936, filed Aug. 6, 2002 and entitled "Flexible Loyalty Points Programs," various other types of player tracking cards, devices and readers may be used. (application Ser. No. 10/214,936 is incorporated by reference for all purposes.) Moreover, other identification information (e.g., biometric information) may be captured In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or "comps" for the player such as free meals or free rooms. Many details of player tracking devices and methods not described herein are set forth in U.S. patent application Ser. No. 10/246,373, entitled "Player Tracking Communication Mechanisms In A Gaming Machine," which has been incorporated herein by reference for all purposes.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 100 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 100, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 100. In some embodiments, these tickets may be used by a game player to obtain game services. In addition, when the player has inserted a player tracking card in the card reader to initiate a player tracking session, to prevent the player from leaving or "abandoning" their card in the card reader 24, a voice message, such as "please remove your card," may be projected from the sound projection device 44.

Figure 5:
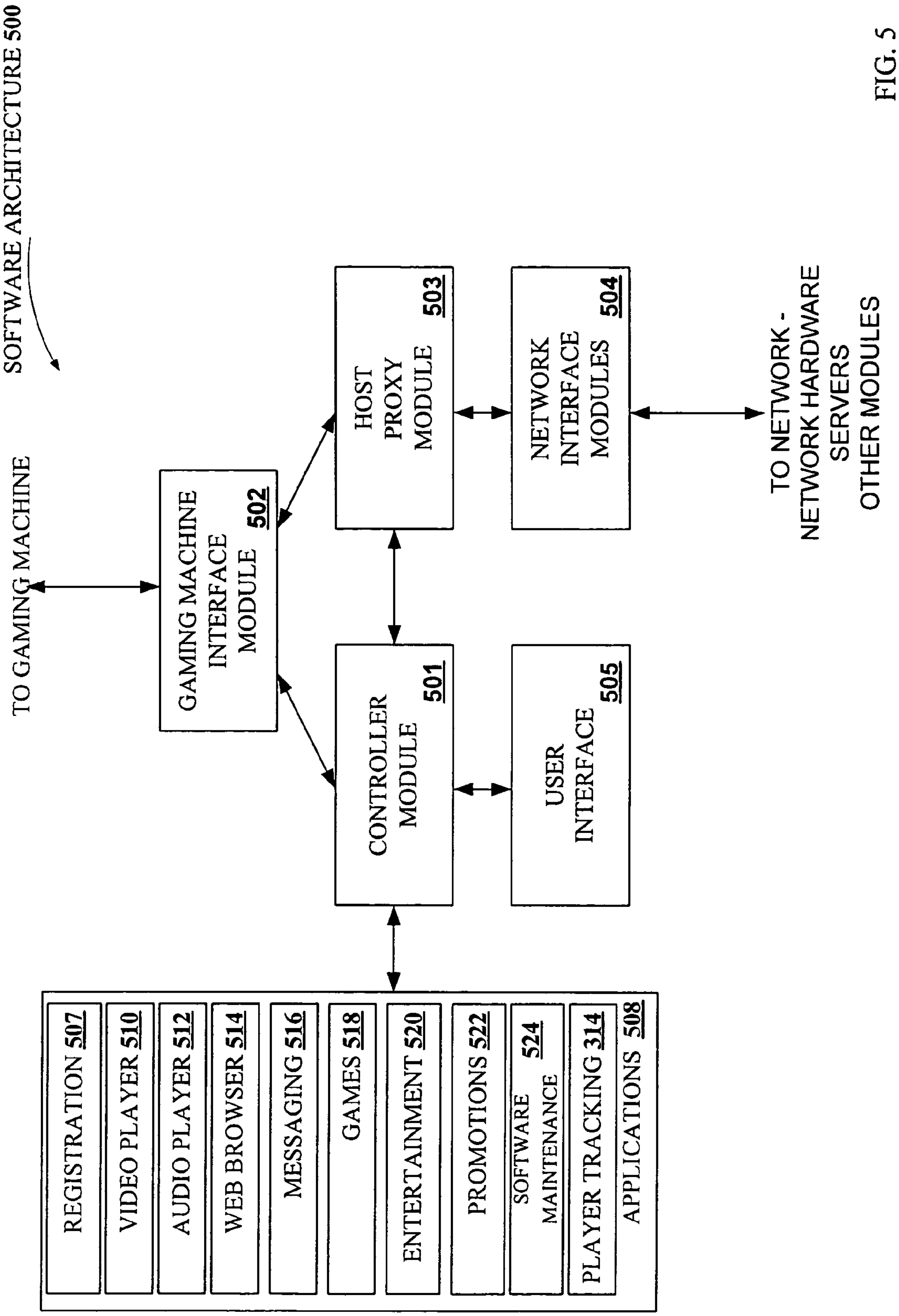
FIG. 5 is a block diagram depicting exemplary software architecture according to some implementations of the invention.

FIG. 5 is a block diagram of a software architecture 500 for a module of the present invention. The modular architecture may allow different components of the software to be upgraded and bugs to be fixed by replacing only affected components, e.g. via a download from a portable memory device or a server. In addition, the supported features in the module may be upgraded by downloading new application software 508 or upgrading existing application software on the unit.

The controller module 501 may utilize an operating system to schedule and prioritize tasks executed by the module, including loading software into RAM for execution. The applications 508 are examples of software that may be loaded into RAM for execution by the controller module 501. The controller module 501 may send information to the other software modules, such as a gaming machine interface module 502, a host proxy module 503, a user interface 505 and the various applications 508 and receive information from these software modules. The different software modules may communicate with the controller module 501 and each other via well-defined application program interfaces (APIs).

The gaming machine interface module 502 may include logic for communicating with gaming machines using different proprietary communication protocols and non-proprietary communication protocols as was described with respect to FIG. 3A. The gaming machine interface module 502 may be used to send data to the host gaming machine and receive data from the host gaming machine. The data received from the gaming machine may include gaming information, such as, gaming machine identification information, gaming machine software information, gaming machine status information and metering information on the gaming machine. The module may be able to download software to the gaming machine via the gaming machine interface module 502.

The host proxy module 503 may be used to manage communications between the module and devices that may communicate with the module via a network. The gaming devices may include but are not limited to remote servers, other modules, remote gaming machines and data collection units. The communications with different devices may be enabled by a plurality of network interface modules 504. The network interface modules may allow the module to communicate using communication protocols required by different devices. For instance, player tracking/accounting servers from different manufacturers may use different communication protocols.

The controller module 501 may execute a number of applications 508. A number of applications 314 have been described above. In other embodiments, the controller module 501 may include logic for automatically registering and deregistering the module and/or the host gaming machine with one or more remote servers. Before the module beginning communications with a remote server, the remote server typically requires information used to recognize the module and the host gaming machine. Traditionally, information needed by a remote server database to recognize a particular gaming machine has been entered into the remote server in a manual process. However, the registration logic 507 executed by the controller module 501 may be used to automatically transfer the information required for gaming machine registration to one or more remote servers. Details of the registration and deregistration method are described with respect to FIGS. 12 and 13 of U.S. patent application Ser. No. 10/246,373, entitled "Player Tracking Communication Mechanisms In A Gaming Machine," which has been incorporated herein by reference for all purposes.

In some embodiments, the controller module 501 can execute one or more software applications allowing the module to perform software maintenance and/or to change content that may be used by the module, the gaming machine, etc. In some implementations, the software applications of controller module 501 may be performed without any user input. In other implementations the software applications may facilitate a process of downloading data, such as software upgrades, content, etc.

For example, software maintenance application 524 may allow the controller module 501 to determine versions of software currently in use on the module, the gaming machine, a peripheral, etc. In some implementations of the invention, controller module 501 logs into a server and compares the versions of software and/or content currently in use with software versions available on a server or a portable memory device to determine when an upgrade is needed. Controller module 501 may also compare software and/or content received from a portable memory device with software currently in use to determine whether an upgrade would be desirable. The software and/or content may be upgraded to fix errors and/or to add new features.

Figure 6:
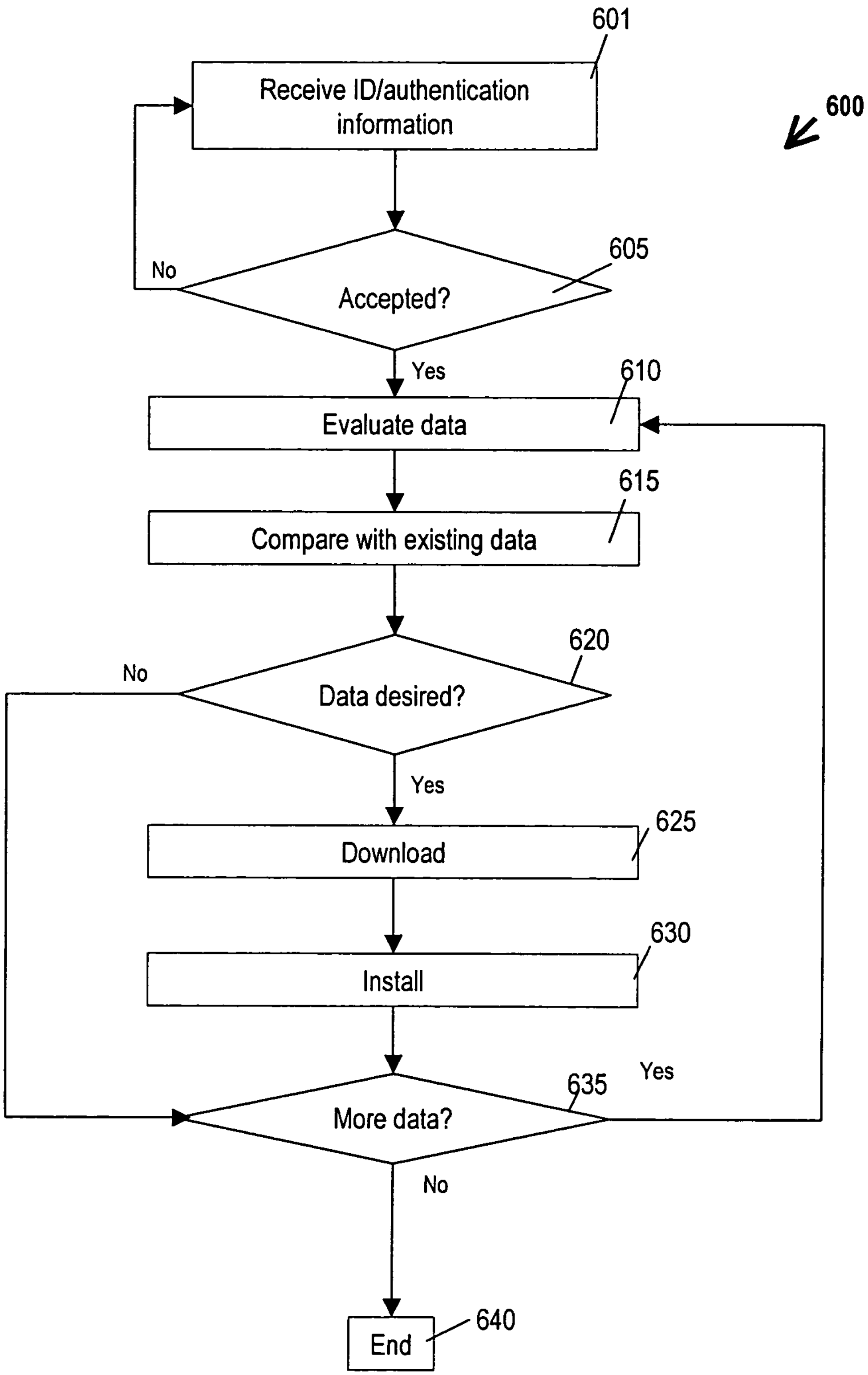
FIG. 6 is a flow chart that outlines a method of downloading and installing data according to some implementations of the invention.

One such process is outlined in FIG. 6. It will be appreciated that the steps of method 600 may not always be performed in the order shown in FIG. 6, that some steps may be omitted and that additional steps may be performed within the scope of the present invention. Method 600 begins in response to a determination (e.g., by the controller module) that it is time to evaluate whether data should be downloaded for a replacement or an upgrade of data currently in use. This determination may be made in various ways, such as but not limited to 1) in response to a time factor monitored by the module, such as checking for upgrades during a predetermined time interval; 2) in response to a command received from a server; or 3) in response to an input received at the module. The input received at the module may be generated by an operator, e.g. in step 601. For example, software maintenance and/or downloading of data can be initiated by the insertion of a portable memory device containing software or by other operator input, e.g., from key pad 220, by voice recognition of a command received by microphone 207, etc.

In step 601, both identity and authentication information may be received. For example, an operator may initiate the process by engaging a portable memory device with the module. In some implementations, an operator enters a password for identification purposes (step 601) and the password is accepted or rejected (step 605). In some implementations, the portable memory device includes identification information regarding one or more operators who are permitted to download data to the module. The identification information could be, for example, biometric information that can be compared to biometric information received from the operator, e.g. by a fingerprint scan or a retinal scan. In some implementations, the module includes a device for receiving such biometric information. In other implementations, the portable memory device itself includes a sensor for receiving biometric information. Preferably, the operator is given more than one opportunity to for identification.

Whether the data are to be received from a portable memory device or a network device, the data are preferably authenticated prior to downloading. This authentication process may be via any method known by those of skill in the art.

If the authentication process and, if applicable, the identification process, are completed successfully, method 600 continues. For example, version information of software and/or content may be determined (step 610) and compared with software and/or content currently in use (step 615), whether by the module, the gaming machine or a peripheral device. For example, the module may survey software and/or content that is being used on the module and the host gaming machine, compare the software being used with software available elsewhere, e.g., from a network device or a portable memory device.

If it would be desirable to download the data (e.g., if a newer version of software is available), the data are downloaded (at least temporarily) to a memory, such as memory 316, in the module (step 625). An advantage of using the module as a temporary cache for gaming machine software is that it may prevent performance degradation of the gaming machine resulting from large data transfers. The module may store the downloaded data in a storage device, such as a hard drive, solid state memory, etc.

As noted above, these data may be transferred to the gaming machine or retained by the module. In some implementations, the storage device may serve as a temporary cache for software to be executed on the gaming machine. As noted above, some modules of the present invention are configured to run gaming machine software. Accordingly, a storage device of the module can provide longer-term storage for downloaded gaming machine software to be executed by the module and/or for content to be reproduced by the module.

Downloaded software may then be installed, if applicable, either on the gaming machine or the module (step 630). For example, the module may notify the gaming machine that it is has downloaded software that is available for installation on the gaming machine. The gaming machine may notify the module when it is ready to receive the software. When the module receives the software request from the gaming machine, the module may download the software to the gaming machine.

After the module or the gaming machine has successfully received data and/or installed new software, the device may send an indication of such reception and/or installation. For example, the device may notify a server of the successful reception of the data and/or installation of the software from the server.

It may be desirable to segregate downloading operations. For example, it may be desirable to separate the downloading of software and the downloading of content into discrete operations. In one such example, a portable memory device may contain both content for reproduction by the module and software for execution by the gaming machine. Therefore, in step 635 it is determined whether more data are available for evaluation. If so, the process returns to a previous step. For example, the process may return to step 610, wherein the additional data may be evaluated. Alternatively, all of the data may have been previously evaluated and found to be desirable. If so, the process may return to step 625 and the additional data may then be downloaded. If there are no additional data, the process ends (step 640).

In other embodiments, controller module 501 (see FIG. 5) may control a number of applications that utilize various other capabilities of the module, such as multimedia capabilities and peer-to-peer capabilities. For example, the multimedia capabilities are particularly advantageous for the reproduction of desired content. Peer-to-peer communication between different modules may allow different groups of modules to be linked and unlinked for cooperative or competitive game play, e.g. for class 2 game play. Details of such applications are described with respect to FIG. 11 of U.S. patent application Ser. No. 10/246,373, entitled "Player Tracking Communication Mechanisms In A Gaming Machine," which has been incorporated herein by reference for all purposes.

Figure 7:
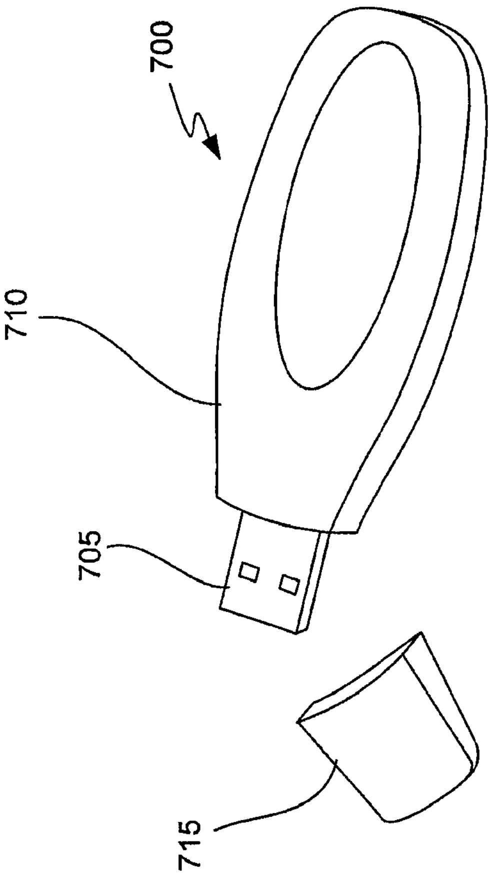
FIG. 7 illustrates one type of portable memory device that may be used in accordance with the present invention.

FIG. 7 illustrates one type of portable memory device that may be used in accordance with the present invention. Memory stick 700 includes connector 705, which in this example is configured for attachment to a USB port. Body portion 710 includes a solid state memory encased in a protective shell. Cap 715 protects connector 705 and keeps connector 705 clean when memory stick 700 is not in use.

Some existing memory sticks have a storage capacity of up to 2 GB, are powered directly via a USB port and have write-protect and password protection. In some embodiments, memory stick 700 includes a built-in fingerprint sensor for security and authentication, as described below with reference to FIG. 8.

Figure 8:
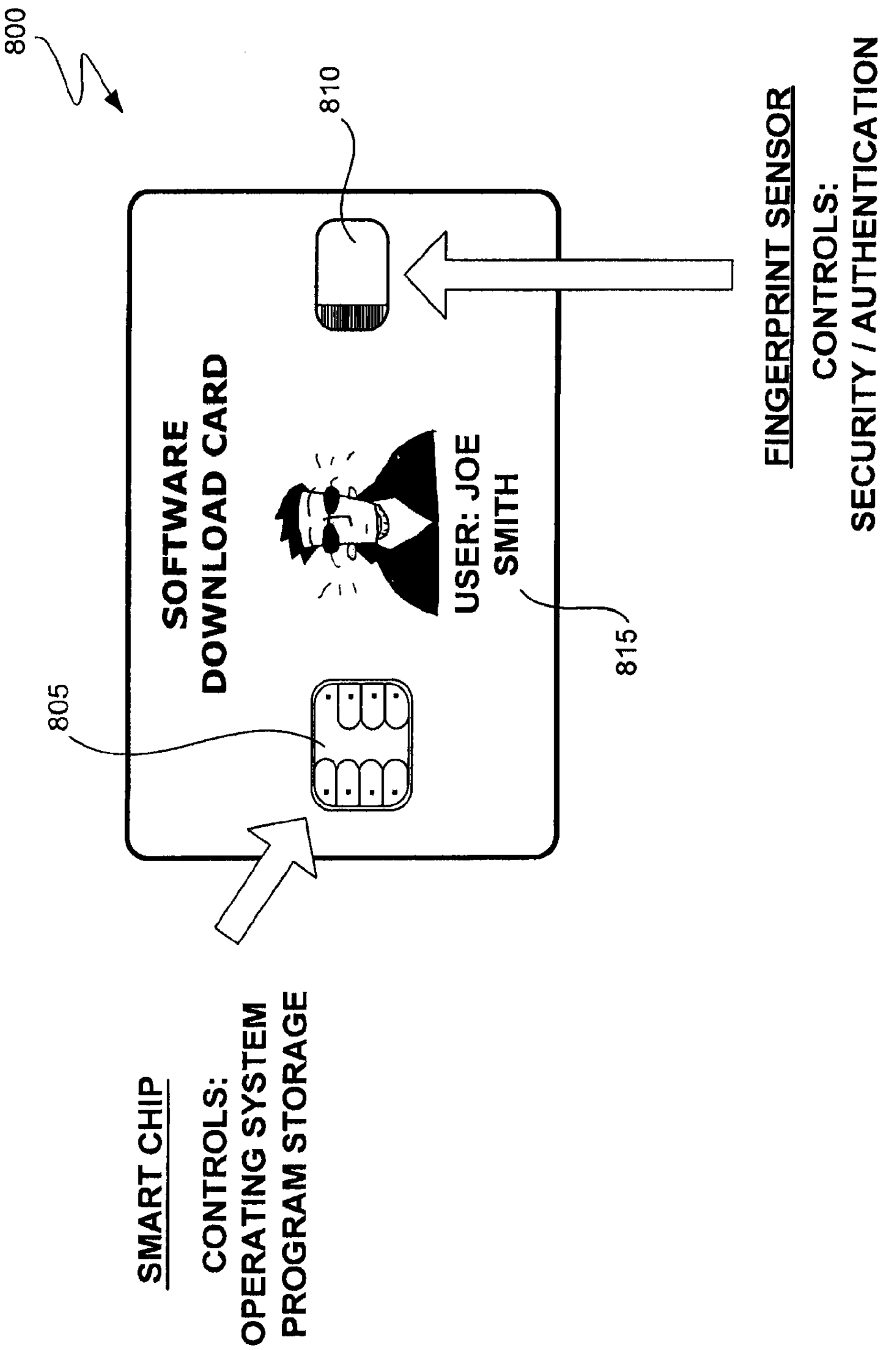
FIG. 8 illustrates one type of portable memory device that may be used in accordance with the present invention.

FIG. 8 illustrates a second type of portable memory device that may be used to implement some method of the present invention. Card 800 is a type of "smart card." There are three general categories of smart cards: contact, contactless and hybrid or "combi" smart cards. A contact smart card requires insertion into a smart card reader with a direct connection to a conductive micromodule on the surface of the card (typically gold plated). It is via these physical contact points, that transmission of commands, data, and card status takes place. In this example, card 800 is a contact smart card that is configured for insertion into a module's smart card reader.

In other embodiments, card 800 is a contactless card that requires only close proximity to a reader. Both the reader and the card have an antenna and it is via this contactless link that the two communicate. Most contactless cards also derive the internal chip power source from this electromagnetic signal. The range is typically two to three inches for non-battery powered cards.

Some embodiments of card 800 are combi cards or hybrid cards. A hybrid card has two chips, each with its respective contact and contactless interface. The two chips are not connected, but for many applications, this hybrid serves the needs of consumers and card issuers. Just emerging is the combi card which in a single chip card with a contact and contactless interface. With combi cards, it is possible to access the same chip via a contact or contactless interface, with a very high level of security.

Card 800 includes chip 805 for storing data, including any necessary software for implementing the functions of card 800. Chip 805 can be, for example, a microprocessor with internal memory or a memory chip with non-programmable logic.

The chips 805 used in various embodiments of card 800 fall into two general categories: microprocessor chips and memory chips. A memory chip can be viewed as a small floppy disk with optional security. Currently, memory cards can hold from 103 bits to 16,000 bits of data. They are less expensive than microprocessor cards but with a corresponding decrease in data management security. They depend on the security of the card reader for their processing and are ideal when security requirements permit use of cards with low to medium security.

A microprocessor chip can add, delete and otherwise manipulate information in its memory. It can be viewed as a miniature computer with an input/output port, operating system and hard disk. Microprocessor chips are currently available in 8, 16, and 32 bit architectures. Their data storage capacity ranges from 300 bytes to 32,000 bytes with larger sizes expected with semiconductor technology advances. Their ability to download not just data but applications is being advanced by Sun with JavaCard™ technology and by Mondex with Multos™.

JavaCard™ smart cards are based on Java technology from Sun Microsystems. Java is an object-oriented, platform-independent, multithreaded, programming environment. Java is the foundation for smart Web and networked services and allows for secure enterprise extension through platform independence. Different systems can talk to each other—from Java-based smart cards to supercomputers—regardless of the underlying hardware or system software.

Java is designed so that programs can be dynamically loaded over the network and run locally. A browser that can interpret Java bytecode (such as Netscape Navigator or Internet Explorer) can download and locally execute applets that are embedded in a Web page. In some embodiments, the activities of downloading and executing can be completely automatic, requiring no user approval for, or knowledge of, the process.

Chip 805 may include the necessary data and software for implementing a biometric security system for verifying the identity of the user of a portable memory device. In this example, chip 805 includes the necessary software for operating fingerprint sensor 810. A fingerprint offers a reliable and inexpensive means of authenticating an individual's identity, one far more secure than personal identification numbers (PINs) or passwords which are subject to being compromised or forgotten. By linking the user directly to the transaction process through his or her fingerprint, proof is given that the authorized user is indeed present—not just someone who happens to know a short string of numbers or letters.

Fingerprint sensor 810 may be of a type, for example, that has been engineered by companies such as Biometric Associates in Timonium, Md. and Fingerprint Cards AB in Stockholm, Sweden. These companies have produced a complete, embeddable fingerprint identification system that can be inserted into a variety of access devices requiring user authentication. Preferably, fingerprint sensor 810 performs all sensor, processor and decision-making functions within the module, greatly simplifying the incorporation of biometric recognition into small, mass-produced products such as smart cards and RFID tokens.

The technology currently employs a third-generation capacitive array sensor chip that detects and captures small variations in finger surface capacitance and creates a three-dimensional electrical image of the fingerprint's unique pattern. To enroll a user in the fingerprint identification system, one or more fingerprints of the authorized person must first be registered. This is accomplished in conjunction with an external enrollment station that activates and controls the process. First the user places his/her fingertip on the fingerprint sensor. It detects and captures the small variations in finger surface-capacitance and creates a three-dimensional electrical image of the fingerprint's unique papillary pattern. These signals are verified and then programmed under the control of the enrollment station into protected memory on the module. Upon completion of the enrollment process, the module is "locked" and subsequent placement of any finger on the sensor triggers the verification process. This involves comparing the previously stored "registered" template with the fingerprint image using a special programmed algorithm. In the case of a fingerprint-enabled smartcard, if the result matches, the person holding the card (not just someone who happens to know the PIN) is verified as its authorized user.

Although the foregoing invention has been described in some detail for purposes of clarity of understanding, it will be apparent that certain changes and modifications may be practiced within the scope of the appended claims. For example, in alternative embodiments, a laptop computer, cell phone or PDA can allow downloads by utilizing either an internal or external card reader tied to those devices.

Another method allows for player-activated bonusing through the module wherein the portable memory device is the "key" to allow special promotions, bonusing etc. to be displayed, e.g. by the module. In another embodiment, the use of a smart card provides a method of downloading plug-in multimedia content (such as advertisements) that has been developed via a Content Developers Kit. For example a gaming establishment could take data from external data sources (video clips, audio clips, text, configurable data, etc.) and translate them into a form understood by a module and/or a player tracking unit. This content would then be transferred to a smart card and inserted into a card reader of the module for download.

In addition, a portable memory device can be given to a player for special promotions or in a random way to allow for special bonusing or promotions. For example, players could be given smart cards upon exiting a casino show that provided for a specific content download into a module-equipped gaming machine. The download could be based on many different parameters that allow the player certain bonus opportunities that normally wouldn't be available.

In another embodiment, a biometric sensor (e.g., a fingerprint sensor) could be incorporated into another external device, such as a computer keyboard, a PDA, a cell phone or a standalone input unit. Biometric data stored on a portable memory device could be compared with biometric data obtained from the other external device in order to verify the identity of a person authorized to download data to the module.

The invention claimed is:

1. A module for a wager-based gaming machine, comprising:

a first module port configured for downloading first data from a server via a network;

a first random access memory ("RAM") device having a first port and a second port, the second port configured for communication with the wager-based gaming machine via a communication bus; and a first physical central processor unit ("CPU") configured to read downloaded data and write the downloaded data to the first RAM device via the first port, the module being configured to emulate a second RAM device of the gaming machine using the first RAM device, the second RAM device being configured to store software for games of chance for execution on a second physical CPU of the gaming machine, wherein the first RAM device is configured to be coupled to the gaming machine such that emulation of a second RAM device of the gaming machine occurs via communication between a memory included in the gaming machine and the first RAM device.

2. The module of claim 1, wherein the second RAM device comprises at least one electrically programmable read-only memory ("EPROM") device.

3. The module of claim 2, further comprising an in-circuit EPROM emulator for connecting the module and the EPROM device.

4. The module of claim 1, further comprising a second module port configured for downloading second data from a portable memory device.

5. A player tracking unit comprising the module of claim 1.

6. A module for a wager-based gaming machine, comprising:

a first module port configured for downloading first data from a server via a network; and a dual-ported random access memory ("DPRAM") device having a first port and a second port, the second port configured for communication with a communication bus, the DPRAM device being configured to be simultaneously accessible by both a first physical CPU and the wager-based gaming machine's physical CPU to read and write from the first port and the second port, the first physical CPU configured to read downloaded data and write the downloaded data to the DPRAM via the first port;

the module being configured to emulate a gaming machine memory device that is configured to store software for games of chance for execution on the gaming machine's CPU, wherein the DPRAM device is configured to be coupled to the wager-based gaming machine such that emulation of a gaming machine memory device occurs via communication between a memory included in the gaming machine and the DPRAM device.

7. The module of claim 6, further comprising a second module port configured for downloading second data from an external memory device.

8. The module of claim 6, further comprising an in-circuit memory emulator for connecting the module and the gaming machine memory device.

9. A player tracking unit, comprising:

a first port configured for communication with a network;

a first physical central processing unit ("CPU") configured for enabling player tracking functionality to associate game play with a player and for communication with a game server via the network; and a first random access memory ("RAM") device configured for communication with the first CPU and for communication with a second physical CPU of a wager-based gaming machine, the first RAM device being configured to receive downloaded games of chance from the first CPU, the first RAM device being further configured to emulate a second RAM device of the gaming machine, the second RAM device being configured for storing software for games of chance for execution on the second CPU of the gaming machine and the player tracking unit being configured to be physically coupled to the gaming machine, wherein the first RAM device is configured to be coupled to the gaming machine such that emulation of a second RAM device of the gaming machine occurs via communication between a memory included in the gaming machine and the first RAM device.

10. The player tracking unit of claim 9, wherein the second RAM device is an EPROM device.

11. A gaming machine comprising the player tracking unit of claim 9.

12. The player tracking unit of claim 9, further comprising a second port configured for communication with an external memory device.

13. A player tracking unit, comprising:

a first port configured for communication with a network;

a first physical central processing unit ("CPU") configured for enabling player tracking functionality to associate game play with a player and for downloading games of chance from a game server via the network;

a first random access memory ("RAM") device configured for communication with the first CPU, the first RAM device being configured to store downloaded games of chance from the first CPU, the first CPU being further configured for executing the downloaded games of chance and controlling gaming peripherals of a wager-based gaming machine for implementation of a game, thereby bypassing, at least in part, a second physical CPU of the gaming machine, wherein the first RAM device is configured to be coupled to the gaming machine such that emulation of a second RAM device of the gaming machine occurs via communication between a memory included in the gaming machine and the first RAM device.

14. The player tracking unit of claim 13, further comprising a second port configured for communication with an external memory device.

15. The player tracking unit of claim 14, wherein the second module port comprises a USB port.

16. The player tracking unit of claim 13, wherein the first RAM device comprises a dual-ported RAM ("DPRAM") device.

17. A gaming system, comprising:

a module configured to be physically coupled to a wager-based gaming machine, the module comprising:

a first module port configured for downloading first data from a server via a network; a dual-ported random access memory ("DPRAM") device having a first port and a second port, the second port configured for communication with a communication bus, the DPRAM device being simultaneously read/write accessible from the first port and from the second port, the DPRAM device being configured to emulate a memory of the wager-based gaming machine, wherein the DPRAM device is configured to be coupled to the wager-based gaming machine such that emulation of memory of the wager-based gaming machine occurs via communication between a memory included in the gaming machine and the DPRAM device;

a physical central processor configured to read downloaded data and write the downloaded data to the DPRAM device via the first port; and the wager-based gaming machine, comprising:

apparatus for receiving an input of cash or indicia of credit for wagers on games of chance;

apparatus for playing the games of chance;

a physical logic device for controlling an output of cash or indicia of credit from the gaming machine according to outcomes of the games of chance; and a communication bus for connecting the second port with the gaming machine, wherein the gaming machine is further configured to read the downloaded data via second port and the communication bus.

18. The gaming system of claim 17, wherein the module is further configured to provide the functionality of a player tracking unit.

19. The gaming system of claim 17, further comprising a second module port configured for downloading second data from an external memory device.

20. The gaming system of claim 19, wherein the second module port comprises USB port.

* * * * *

UNITED STATES PATENT AND TRADEMARK OFFICE

CERTIFICATE OF CORRECTION

PATENT NO. : 8,579,711 B2
APPLICATION NO. : 10/927581
DATED : November 12, 2013
INVENTOR(S) : Binh Nguyen et al.

It is certified that error appears in the above-identified patent and that said Letters Patent is hereby corrected as shown below:

IN THE CLAIMS

In column 28, line 17, in Claim 20, delete "comprises USB" and insert -- comprises a USB --.

Signed and Sealed this
Tenth Day of February, 2015

Michelle K. Lee

Michelle K. Lee
*Deputy Director of the United States Patent and Trademark Office*